United States Patent
Yach et al.

(10) Patent No.: US 9,785,318 B2
(45) Date of Patent: *Oct. 10, 2017

(54) SCREEN DISPLAY IN APPLICATION SWITCHING

(71) Applicant: BlackBerry Limited, Waterloo (CA)

(72) Inventors: David Paul Yach, Waterloo (CA); Gerhard Dietrich Klassen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 758 days.

This patent is subject to a terminal disclaimer.

(21) Appl. No.: 14/254,248

(22) Filed: Apr. 16, 2014

(65) Prior Publication Data

US 2014/0229892 A1    Aug. 14, 2014

Related U.S. Application Data

(63) Continuation of application No. 11/374,067, filed on Mar. 14, 2006, now Pat. No. 8,745,526.

(51) Int. Cl.
*G06F 3/048* (2013.01)
*G06F 3/0484* (2013.01)
*G06F 3/0481* (2013.01)

(52) U.S. Cl.
CPC .......... *G06F 3/0484* (2013.01); *G06F 3/0481* (2013.01); *G06F 3/04817* (2013.01)

(58) Field of Classification Search
CPC ...... G06F 3/013; G06F 3/0485; G06F 17/243; G06F 17/246; G06F 21/10; G06F 3/0346; G06F 3/048; G06F 17/24; G06F 9/4443; G06F 9/543
See application file for complete search history.

(56) References Cited

U.S. PATENT DOCUMENTS

| | | | |
|---|---|---|---|
| 5,463,726 A | 10/1995 | Price | |
| 5,554,980 A * | 9/1996 | Hashimoto | G06F 3/0304 340/12.55 |
| 5,892,511 A * | 4/1999 | Gelsinger | G06F 3/0481 715/790 |
| 5,949,418 A | 9/1999 | Shields et al. | |
| 6,760,048 B1 * | 7/2004 | Bates | G06F 3/0481 715/781 |
| 6,831,666 B1 * | 12/2004 | Kreis | G06F 9/4443 715/767 |

(Continued)

FOREIGN PATENT DOCUMENTS

| | | |
|---|---|---|
| EP | 0422577 | 4/1991 |
| EP | 1189131 | 3/2002 |

(Continued)

OTHER PUBLICATIONS

Lincoln et al.; Displaying Scientific graphic on computer; © 1997; IEEE; 14 pages.

(Continued)

*Primary Examiner* — Linh K Pham
(74) *Attorney, Agent, or Firm* — Ridout and Maybee LLP

(57) ABSTRACT

An application-switching program displays representations of applications, for example icons, on a screen of a device. As a user of the device navigates between the representations, a screen of the application to a representation of which the user has currently navigated is shown in the background of the display.

20 Claims, 9 Drawing Sheets

(56) References Cited

U.S. PATENT DOCUMENTS

| | | | | |
|---|---|---|---|---|
| 7,136,475 B1* | 11/2006 | Rogers | .................. | H04M 3/436 |
| | | | | 379/213.01 |
| 7,478,326 B2* | 1/2009 | Holecek | ................ | G06F 3/0481 |
| | | | | 348/E5.104 |
| 2002/0026474 A1 | 2/2002 | Wang | | |
| 2002/0175933 A1* | 11/2002 | Ronkainen | ............ | G06F 3/0481 |
| | | | | 715/727 |
| 2003/0117440 A1 | 6/2003 | Hellyar | | |
| 2004/0254816 A1* | 12/2004 | Myers | .................. | G06F 19/324 |
| | | | | 705/2 |
| 2005/0143137 A1* | 6/2005 | Matsunaga | ........... | G06F 3/1423 |
| | | | | 455/566 |
| 2005/0190971 A1* | 9/2005 | Brubacher-Cressman | | |
| | | | ............................ | G06F 9/4446 |
| | | | | 382/209 |
| 2006/0161847 A1* | 7/2006 | Holecek | ................ | G06F 3/0481 |
| | | | | 715/716 |
| 2007/0150810 A1* | 6/2007 | Katz | ...................... | G06F 3/0481 |
| | | | | 715/229 |
| 2007/0162875 A1* | 7/2007 | Paquette | ............... | G06F 3/0238 |
| | | | | 715/847 |
| 2007/0168878 A1* | 7/2007 | Berstis | .................. | G06F 3/0481 |
| | | | | 715/790 |

FOREIGN PATENT DOCUMENTS

| | | |
|---|---|---|
| EP | 1251515 | 10/2002 |
| JP | 2002196867 | 7/2002 |

OTHER PUBLICATIONS

Haine; Bring related windows forward during Alt-Tab; published on 2009; http://stealthisidea.com/articles.alt-tab-tweek; 9 pages.

Narayanaswami et al.; Application design for a smart watch with a hight resolution display; © 2000; IEEE; 8 pages.

First Office Action dated Jan. 14, 2010 for the corresponding Canadian Patent Application No. 2,581,628.

Fourth Exam Report dated Aug. 24, 2010 for the corresponding European Patent Application No. 06111131.6.

Second Office Action dated May 17, 2011 for the corresponding Canadian Patent Application No. 2,581,628.

Philip Haine "Bring related windows forward during Alt-Tab" Feb. 22, 2006.

Second Exam Report dated Feb. 8, 2008 for the corresponding European Patent No. 06111131.6.

First Exam Report dated Oct. 18, 2006 for the corresponding European Patent No. 06111131.6.

Extended European Search Report dated May 23, 2006 for the corresponding European Patent No. 06111131.6.

Jeff Atwood, "ALT + TAB Extreme" Oct. 8, 2005.

* cited by examiner

SCREEN DISPLAY IN APPLICATION SWITCHING

RELATED APPLICATION DATA

The present application claims priority to and is a continuation of non-provisional U.S. patent application Ser. No. 11/374,067, filed Mar. 14, 2006, which is hereby incorporated by reference in its entirety.

BACKGROUND

A device may have two or more applications running concurrently. For example, a user of a personal digital assistant (PDA) may activate an e-mail application, a calendar application, an instant messaging (IM) application and the "home page" of the PDA. The display of a PDA is small, so usually only one of the running applications has its screen shown on the display at any given time. The device may have a task-switching program to enable a user to select which application has its screen shown on the display.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

According to embodiments of the invention, an application-switching program may display representations of applications, for example icons, on a screen of a device.

As a user of the device navigates between the representations, a screen of the application to a representation of which the user has currently navigated is shown in the background of the display. Showing the screen in the background of the display provides additional feedback to the user regarding the navigation and may assist the user in deciding whether to switch to that application. It also enables the user to monitor the application to a representation of which the user has currently navigated without switching to the application.

An appropriate location in the display for the representations may be determined. For example, the location may be fixed at the center of the display. Alternatively, the location may be determined so as to lessen the amount of information in the screen that is obscured by the representations. Alternatively, if certain areas of the screen are more important than others, the location may be determined so as to reduce the amount of those important areas that is obscured by the representations.

Figure 1:
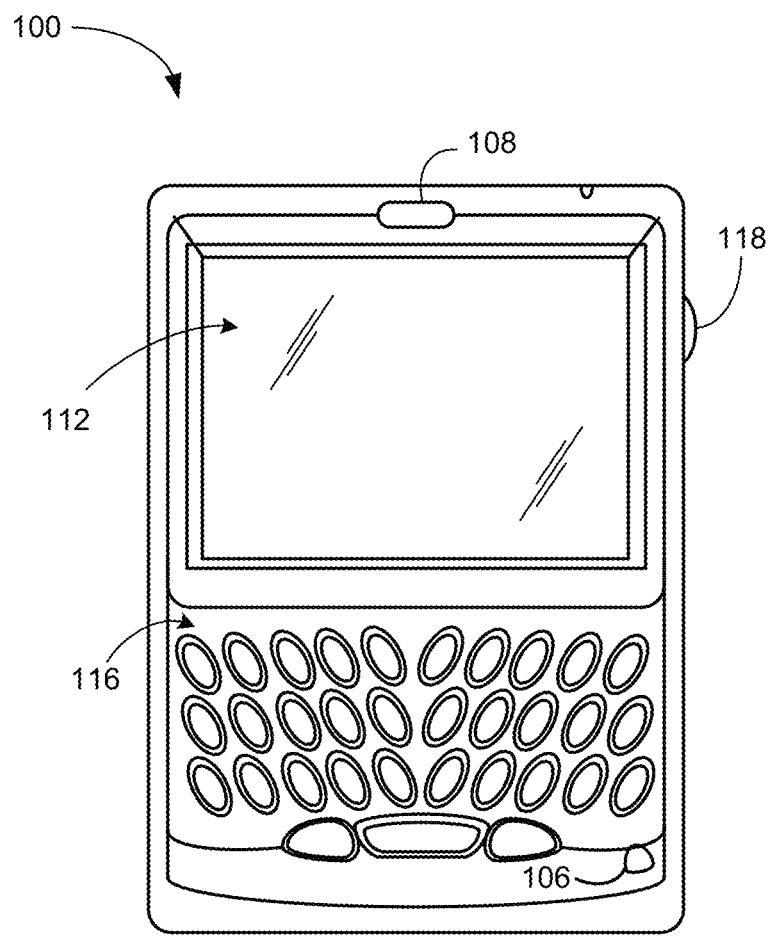
FIG. 1 is an illustration of an exemplary device, according to some embodiments.
Figure 2:
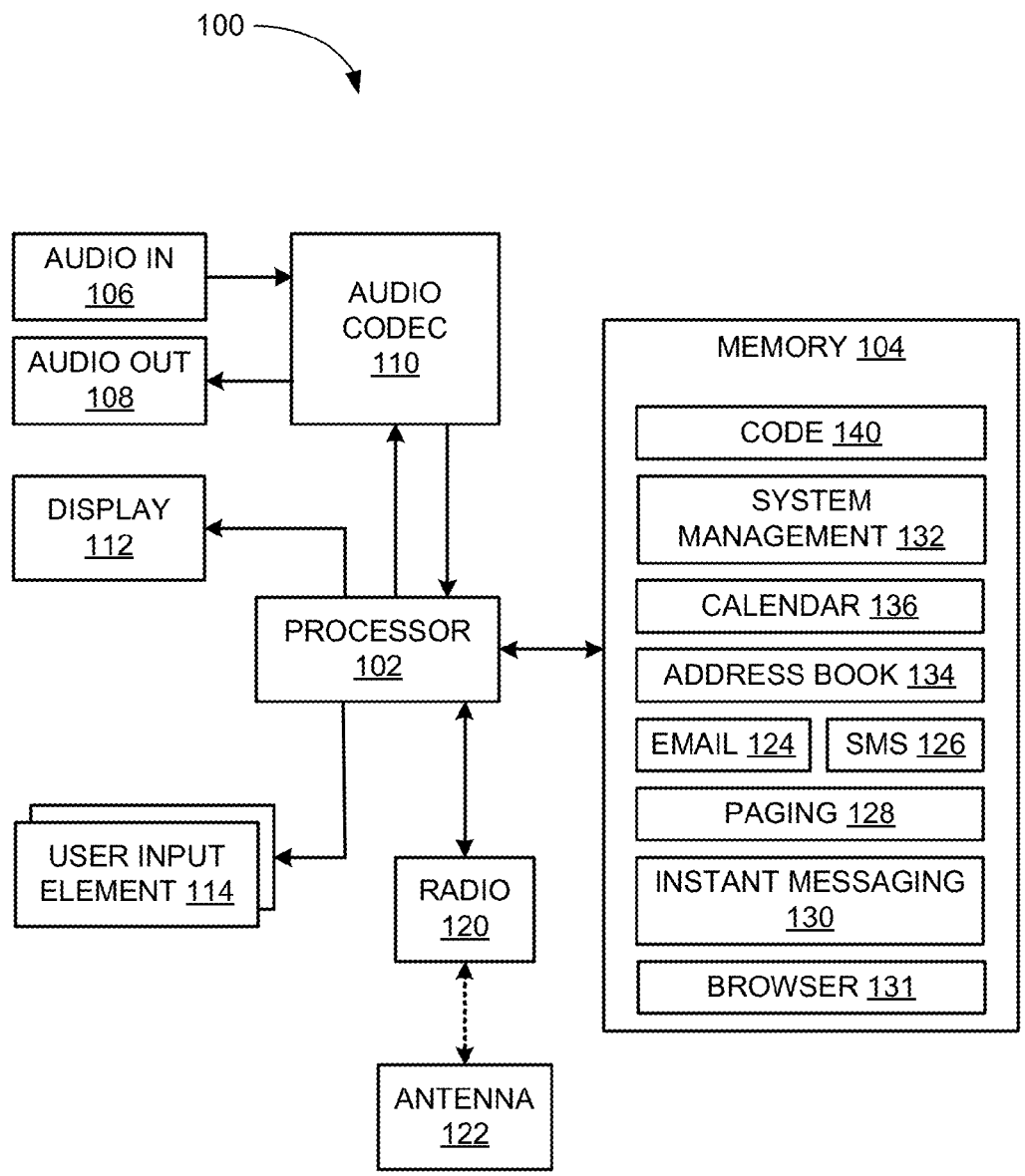
FIG. 2 is a block diagram of an exemplary device, according to some embodiments.

Reference is made now to FIGS. 1 and 2. FIG. 1 is an illustration of an exemplary device 100, according to some embodiments, and FIG. 2 is a block diagram of device 100, according to some embodiments. For clarity, some components and features of device 100 are not shown in FIGS. 1 and 2 and are not described explicitly below.

Device 100 includes a processor 102 and a memory 104 coupled to processor 102. Device 100 includes an audio input element 106, for example a microphone, an audio output element 108, for example, a speaker, and an audio coder-decoder (codec) 110, however, embodiments of the invention are also applicable to devices without these audio components.

Device 100 includes a display 112 coupled to processor 102. Device 100 also includes one or more user input elements 114 coupled to processor 102, for example, a keyboard 116 and a thumbwheel 118. Device 100 may include additional user input and/or output elements that are not shown in FIG. 1, for example a trackball. Keyboard 116 may be embedded in full or in part within display 112, i.e. display 112 may be a touch screen.

Device 100 includes a radio 120, compatible with one or more wireless communication standards, coupled to processor 102 and an antenna 122 coupled to radio 120. By way of radio 120, antenna 122 and a communication infrastructure (not shown) that is external to device 100, device 100 may be able to establish telephone and/or data communication sessions with other systems (not shown). However, embodiments of the invention are also applicable to devices without these wireless communication components.

Data communication sessions may include data in the form of plain text, data files, voice files, image files, movie files, streaming audio, streaming video, animation, or any other suitable data form. A non-exhaustive list of examples for data communication sessions includes sending and receiving electronic mail (e-mail), sending and receiving instant messages, sending and receiving paging messages, sending and receiving short message service (SMS) messages, and any other suitable data communication sessions. For data communications supported by device 100, memory 104 may store respective application modules to be executed by processor 102, for example, an e-mail application module 124, an SMS application module 126, a paging application module 128, an instant messaging application module 130, and a web browser application module 131.

Memory 104 stores a system management application module 132 and may optionally store other application modules, for example, an address book or contacts application module 134 and a calendar application module 136.

These application modules are just examples and embodiments of the invention are also applicable to devices with a different set of application modules.

For the purpose of the description and the claims, several terms are defined hereinbelow: a) an application is considered "running" if system management application module 132 or a user of device 100 previously selected that application for execution, and execution of that application is not yet terminated; and b) an application is considered "active"

if it is running and a screen associated with that application is displayed on display 112. System management application module 132 may be considered running at all times.

According to some embodiments, memory 104 may store executable code 140 which, when executed by processor 102, enables a user to switch between applications running on device 100. The application to which a user has switched will have at least one of its screens shown in display 112.

Figure 3:
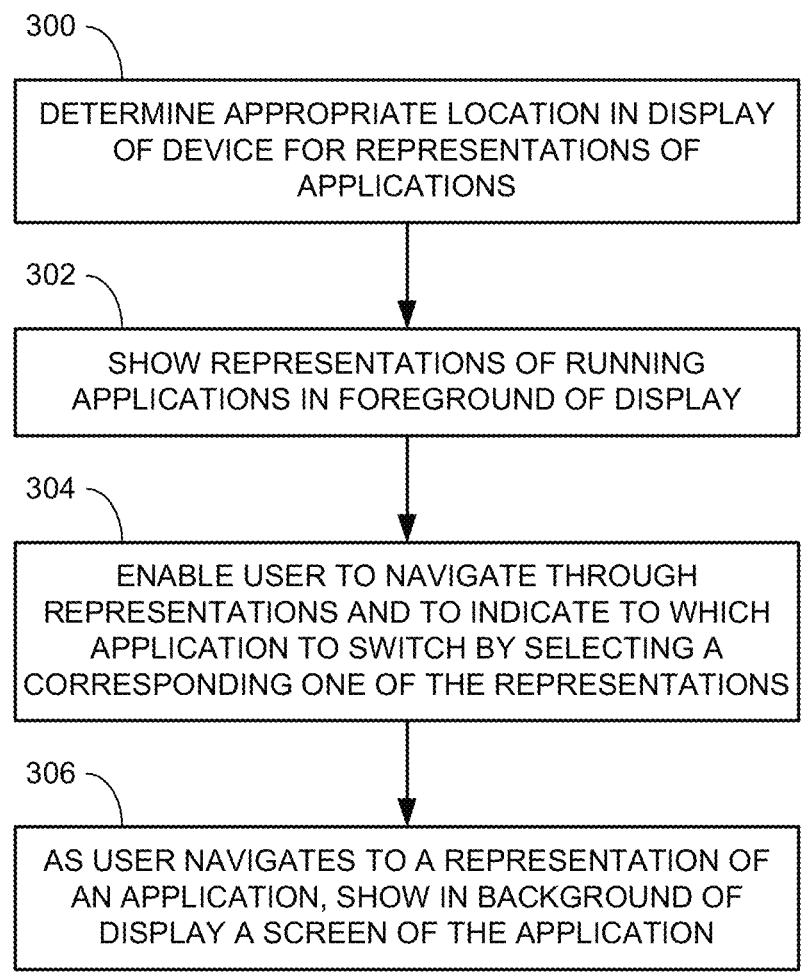
FIG. 3 is a flowchart of an exemplary method implemented by an instant messaging client on a device, according to some embodiments.

FIG. 3 is a flowchart of an exemplary method to be implemented by code 140, according to some embodiments.

At 300, an appropriate location in display 112 for representations of running applications may be determined. For example, the location may be fixed at the center of display 112. Alternatively, the location may be determined so as to reduce the amount of information in the screen that is obscured by the representations. Alternatively, if certain areas of the screen are more important than others, the location may be determined so as to reduce the amount of those important areas that is obscured by the representations.

At 302, representations of running applications are shown in the foreground of display 112.

At 304, navigation through the representations by a user of device 100 is enabled. The user uses at least one user input element 114 to navigate through the representations. Using at least one user input element 114, the user may indicate to device 100 to which application to switch by selecting a corresponding one of the representations. For example, the user may navigate through the representations by rolling thumbwheel 118 and may select a representation by activating a tactile switching action of thumbwheel 118.

At 306, as the user navigates, a screen of the application to a representation of which the user has currently navigated is shown in the background of display 112.

Figure 4:
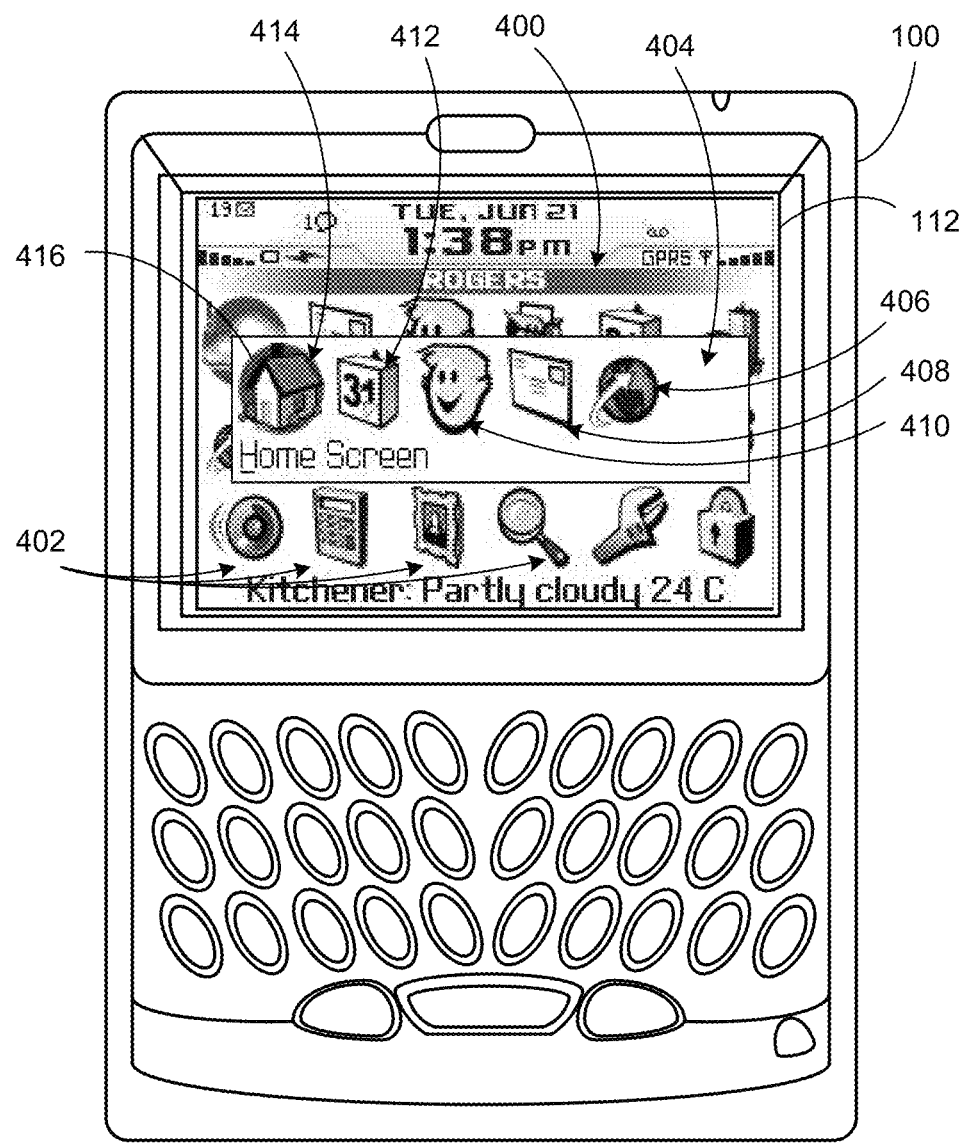
FIGS. 4-9 are illustrations of an exemplary device and its display, according to some embodiments.

FIG. 4 illustrates an exemplary screen 400 shown on display 112. Screen 400 is referred to as a "Home screen" and is associated with system management application module 132. The home screen includes representations 402 of application modules that are stored in memory 104.

In response to an input previously received from a user of device 100, a subscreen 404 is shown in the foreground of display 112, thereby obscuring a portion of screen 400. Subscreen 404 includes representations 406, 408, 410, 412 and 414 of applications that are running on device 100, namely application modules 132, 136, 130, 124 and 131, respectively. In this example the representations are icons, however, other suitable representations such as text are also possible.

A user of device 100 may navigate through representations 406, 408, 410, 412 and 414, and may indicate to device 100 to which of the applications to switch by selecting a corresponding one of the representations. During navigation, the representation to which the user has navigated is emphasized in subscreen 404 with respect to the others. In FIG. 4, representation 414 of the home screen is emphasized by a solid circle 416 around it and display of the caption "Home Screen".

Figure 5:
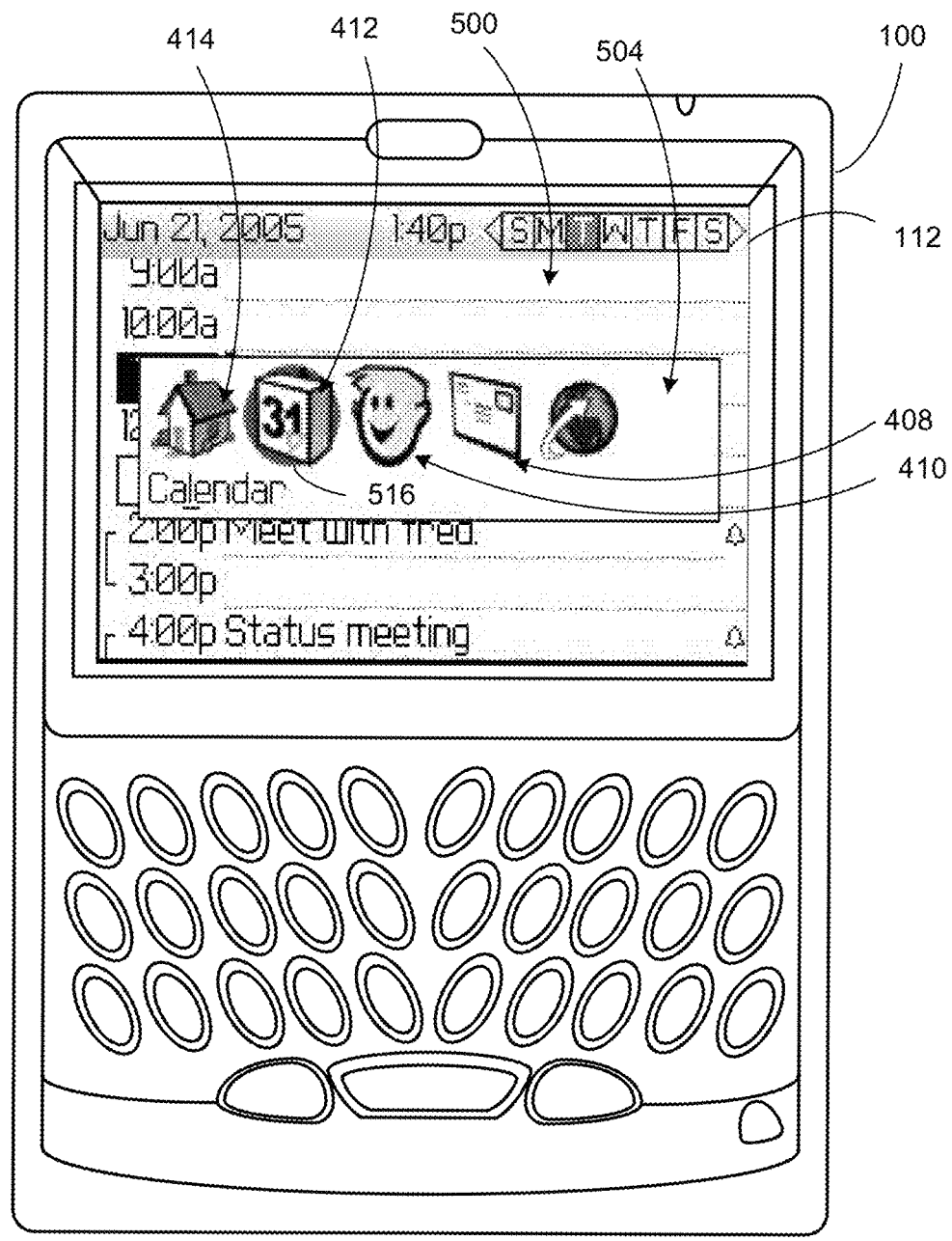

The user may navigate from representation 414 to representation 412 of calendar application module 136. As shown in FIG. 5, an exemplary screen 500 of calendar application module 136 is shown in the background of display 112, while a subscreen 504 is shown in the foreground of display 112. Subscreen 504 differs from subscreen 404 in that representation 414 is not emphasized and representation 412 is emphasized by a solid circle 516 around it and display of the caption "Calendar".

Figure 6:
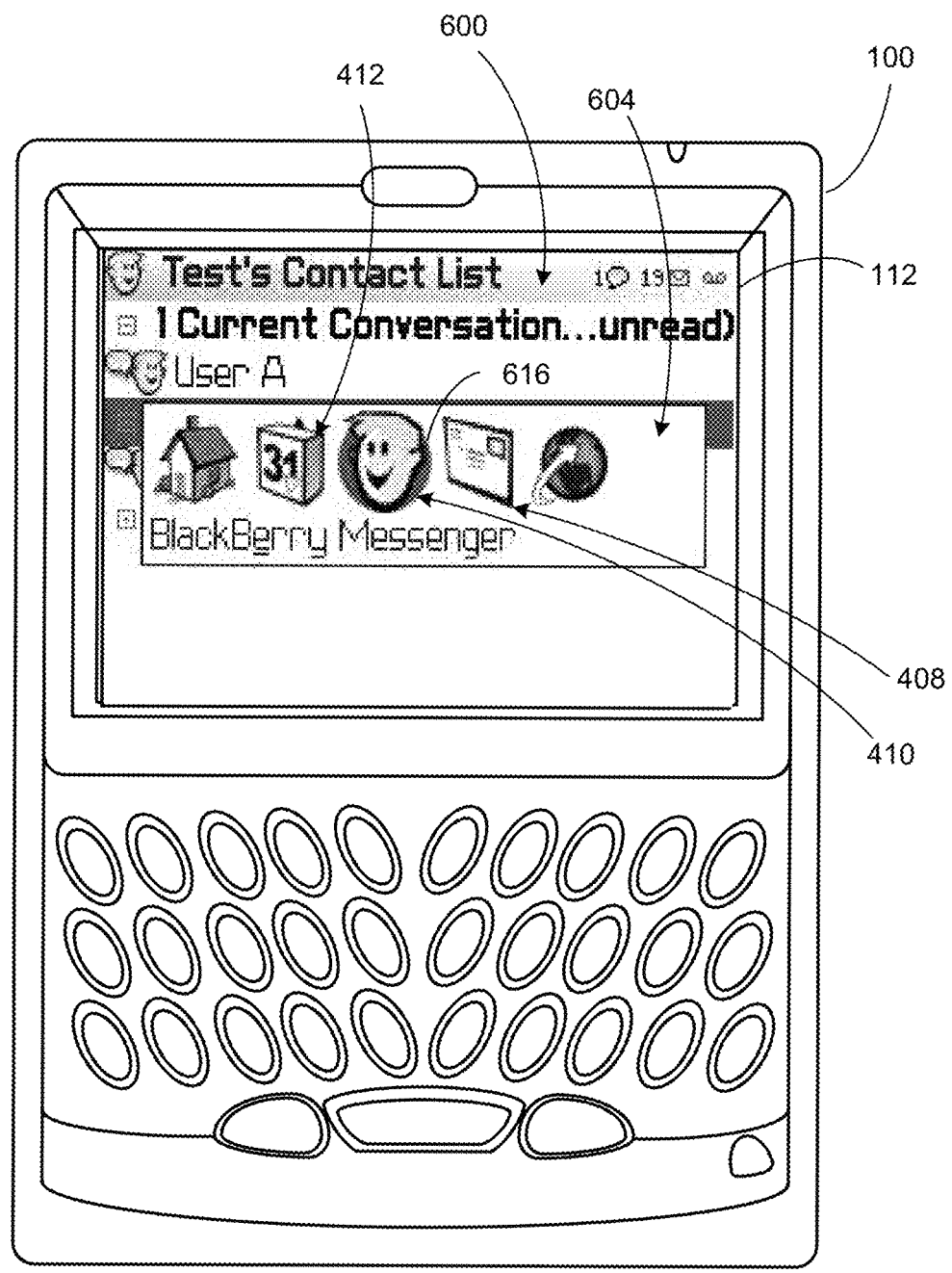

The user may continue to navigate from representation 412 to representation 410 of instant messaging application module 130. As shown in FIG. 6, an exemplary screen 600 of instant messaging application module 130 is shown in the background of display 112, while a subscreen 604 is shown in the foreground of display 112. Subscreen 604 differs from subscreen 504 in that representation 412 is not emphasized and representation 410 is emphasized by a solid circle 616 around it and display of the caption "BlackBerry Messenger".

Figure 7:
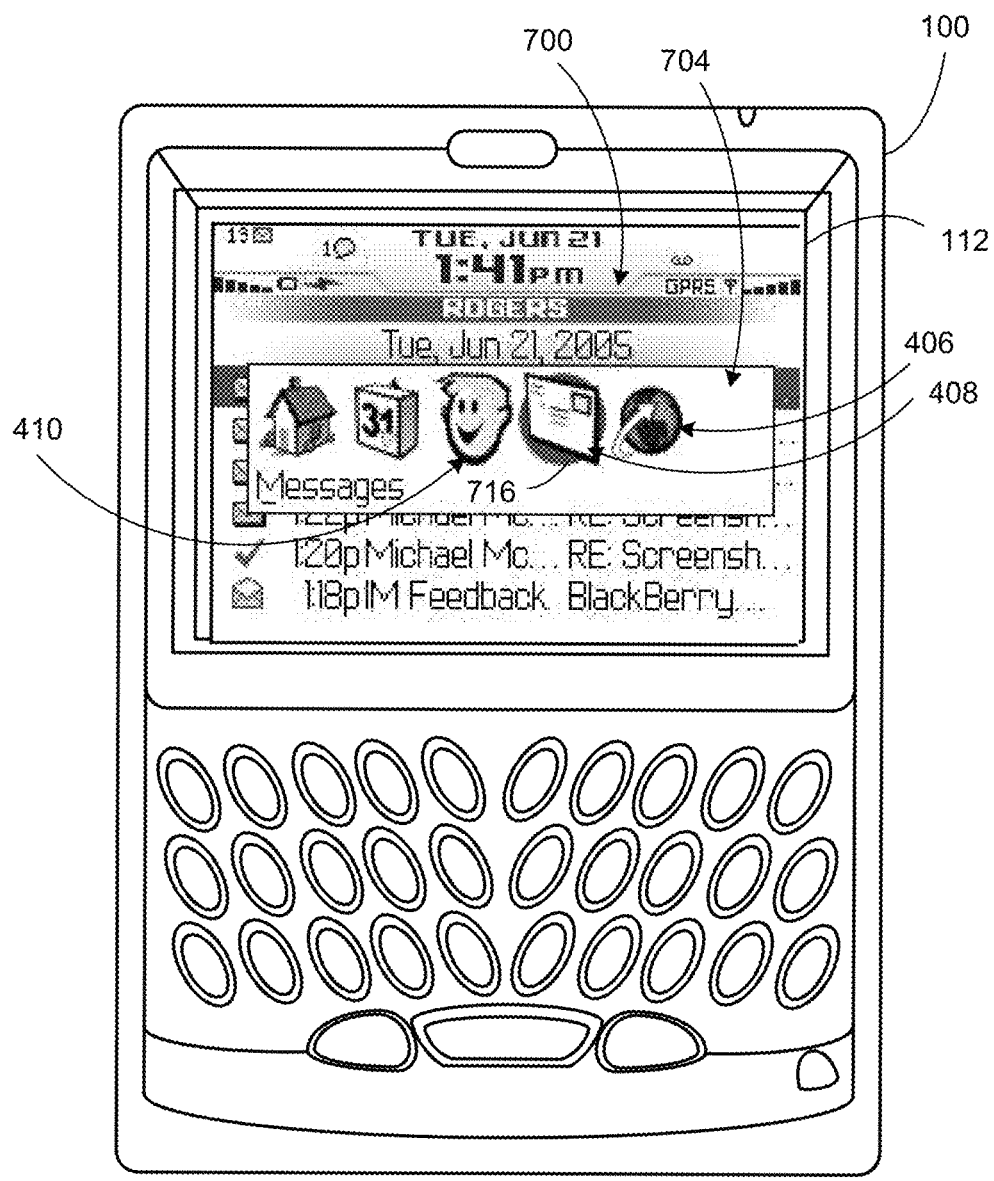

The user may continue to navigate from representation 410 to representation 408 of e-mail application module 124. As shown in FIG. 7, an exemplary screen 700 of e-mail application module 124 is shown in the background of display 112, while a subscreen 704 is shown in the foreground of display 112. Subscreen 704 differs from subscreen 604 in that representation 410 is not emphasized and representation 408 is emphasized by a solid circle 716 around it and display of the caption "Messages".

Figure 8:
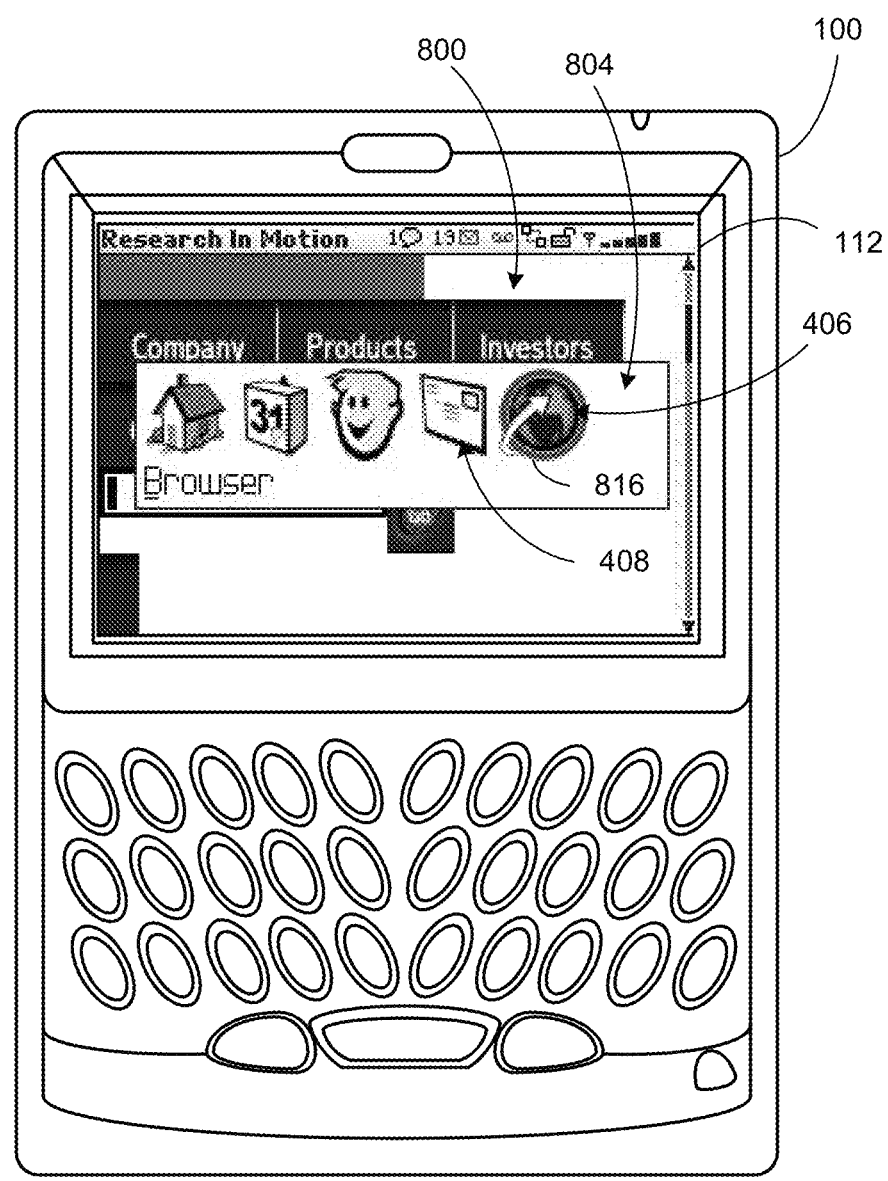

The user may continue to navigate from representation 408 to representation 406 of web browser application module 131. As shown in FIG. 8, an exemplary screen 800 of web browser application module 131 is shown in the background of display 112, while a subscreen 804 is shown in the foreground of display 112. Subscreen 804 differs from subscreen 704 in that representation 408 is not emphasized and representation 406 is emphasized by a solid circle 816 around it and display of the caption "Browser".

Figure 9:
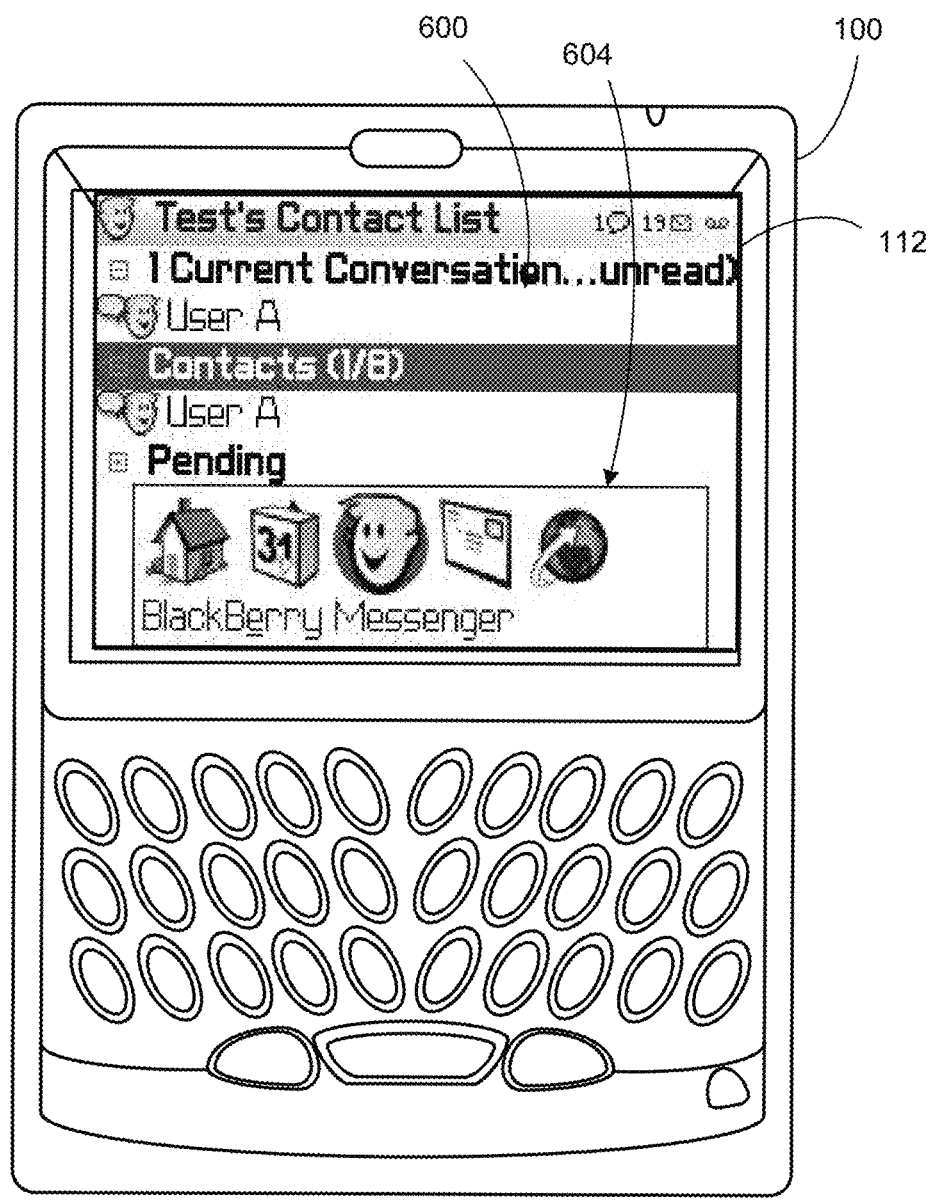

The location of subscreens 404, 504, 604, 704 and 804 in display 112 obscures useful information in screens 400, 500, 600, 700 and 800, respectively. Therefore, a more appropriate location for the representations of the running applications may be as shown in FIG. 9, in which subscreen 604 is placed so as to lessen the amount of information in screen 600 that is obscured by the representations in subscreen 604. Subscreens 404, 504, 604, 704 and 804 may be moved in different locations of the screen, for example, top, middle, bottom. The location of the subscreens may be defined by the user using Cartesian coordinates of the screen, or may be pre-selected by the user from a set of options such as top, middle and bottom.

Subscreens 404, 504, 604, 704 and 804 show the representations in a single horizontal row, but more than one horizontal row is also possible. Likewise, one or more vertical columns of representations is also possible, and such subscreens may be located to the left, middle or right of the screen.

Various techniques or a combination thereof may be used to distinguish the subscreens in the foreground of the display from the screens in the background of the display. One such technique is to use a larger or smaller font size for the captions in the subscreens than that used in the screens. Another such technique is to have different colors for the icons in the subscreens than the colors of the icons in the screens. Yet another technique is to generate different sounds as the user navigates from one representation to another in the subscreens than the sounds generated as the user navigates in a screen.

Subscreens 404, 504, 604, 704 and 804 will disappear from display 112 once the user has selected a representation to indicate to which application to switch to.

A non-exhaustive list of examples for communication protocols with which radio 120 may comply includes Direct Sequence-Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

Alternatively, device 100 may be "IEEE 802.11-enabled", which means that radio 120 may comply with one or more of the 802.11 family of standards defined by the Institute of Electrical and Electronic Engineers (IEEE) for Wireless Local Area Network (LAN) Medium Access Control (MAC) and Physical layer (PHY) specifications, other existing WLAN standards or future related standards.

A non-exhaustive list of examples for device 100 includes a cellular phone, a smart phone, a personal digital assistant (PDA), an electronic mail (Email) client, a gaming device, a laptop computer, a notebook computer, a wireless terminal, and any other suitable mobile apparatus.

A non-exhaustive list of examples for processor 102 includes microprocessors, microcontrollers, central processing units (CPU), digital signal processors (DSP), reduced instruction set computers (RISC), complex instruction set computers (CISC) and the like. Furthermore, processor 102 may comprise more than one processing unit, may be part of an application specific integrated circuit (ASIC) or may be a part of an application specific standard product (ASSP).

A non-exhaustive list of examples for memory 104 includes any combination of the following:
a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;
b) optical devices, such as compact disk read only memory (CD ROM), and the like; and
c) magnetic devices, such as a hard disk, a floppy disk, a magnetic tape, and the like.

A non-exhaustive list of examples for antenna 122 includes dipole antennae, monopole antennae, multilayer ceramic antennae, planar inverted-F antennae, loop antennae, shot antennae, dual antennae, omnidirectional antennae and any other suitable antennae.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for switching between applications running on an electronic device, the electronic device having a processor coupled to a display and a memory, the method comprising:
displaying an application screen on the display in which application content is displayed, wherein the content of the application screen corresponds to a first application;
displaying a subscreen on the display that overlays a portion of the application screen, wherein the subscreen includes a plurality of application icons each representing an application of a plurality of applications, wherein a first application icon of the plurality of application icons is displayed with emphasis to indicate that the content of the application screen corresponds to a first application; and
changing the content of the application screen behind the subscreen from application content of the first application to application content of a second application and changing the emphasis from the first application icon to a second application icon of the plurality of application icons in response to navigation to the second application icon.

2. The method according to claim 1, wherein navigation to the second application icon does not switch an active application of the electronic device from the first application to the second application.

3. The method according to claim 1, wherein the subscreen is smaller than the application screen.

4. The method according to claim 1, further comprising:
switching an active application of the electronic device from the first application to the second application in response to selection of the second application icon.

5. The method of claim 4, wherein the selection of the representation of the second application icon comprises receiving input selecting the representation of the second application icon while the second application icon is emphasised.

6. The method of claim 4, wherein the switching comprises displaying the content of the second application in the application screen and ceasing the display of the subscreen.

7. The method according to claim 1, wherein displaying the subscreen further comprises:
determining a location for the subscreen on the display to reduce an amount of content of the application screen that is overlaid by the subscreen; and
displaying the subscreen on the display at the determined location.

8. The method according to claim 1, wherein displaying the subscreen further comprises:
determining a location for the subscreen on the display to reduce an amount of content overlaid by the subscreen in areas of the application screen that are more important than other areas of the application screen; and
displaying the subscreen on the display at the determined location.

9. The method according to claim 1, wherein the subscreen further includes a caption for the second application icon in response to the navigation to the second application icon.

10. The method of claim 1, wherein the application screen occupies substantially all of a display area of the display.

11. The method of claim 1, wherein the subscreen is displayed in response to receiving input.

12. The method of claim 1, wherein the navigation comprises navigation of an input element.

13. An electronic device comprising:
a processor;
a display coupled to the processor;
a memory coupled to the processor storing executable instructions;
an input element coupled to the processor; and
wherein the executable instructions, when executed by the processor, cause the processor to:
display an application screen on the display in which application content is displayed, wherein the content of the application screen corresponds to a first application;
display a subscreen on the display that overlays a portion of the application screen, wherein the subscreen includes a plurality of application icons each representing an application of a plurality of applications, wherein a first application icon of the plurality of application icons is displayed with emphasis to indicate that the content of the application screen corresponds to a first application; and change the content of the application screen behind the subscreen from application content of the first application to application content of a second application and changing the emphasis from the first application icon to a second application icon of the plurality of application icons in response to navigation to the second application icon.

14. The electronic device according to claim 13, wherein navigation to second application icon does not switch an active application of the electronic device from the first application to the second application.

15. The electronic device according to claim 13, wherein the subscreen is smaller than the application screen.

16. The electronic device according to claim 13, wherein the code module further configures the processor to:

switch an active application of the electronic device from the first application to the second application in response to navigation to selection of the second application icon.

17. The electronic device according to claim 13, wherein, when displaying the subscreen, the code module further configures the processor to:

determine a location for the subscreen on the display to reduce an amount of content of the application screen that is overlaid by the subscreen; and display the subscreen on the display at the determined location.

18. The electronic device according to claim 13, wherein, when displaying the subscreen, the code module further configures the processor to:

determine a location for the subscreen on the display to reduce an amount of content overlaid by the subscreen in areas of the application screen that are more important than other areas of the application screen; and display the subscreen on the display at the determined location.

19. The electronic device according to claim 13, wherein the subscreen further includes a caption for the second application icon in response to navigation to the second application icon.

20. A non-transitory computer readable medium having instructions tangibly embodied thereon, the instructions, when executed by a processor of an electronic device, causing the portable electronic device to carry a method for switching between applications running on the electronic device, wherein the executable instructions, when executed by the processor of the electronic device, cause the processor to:

display an application screen on the display in which application content is displayed, wherein the content of the application screen corresponds to a first application;

display a subscreen on the display that overlays a portion of the application screen, wherein the subscreen includes a plurality of application icons each representing an application of a plurality of applications, wherein a first application icon of the plurality of application icons is displayed with emphasis to indicate that the content of the application screen corresponds to a first application; and change the content of the application screen behind the subscreen from application content of the first application to application content of a second application and changing the emphasis from the first application icon to a second application icon of the plurality of application icons in response to navigation to the second application icon.

* * * * *